A. K. WHITMER.
BALL BEARING.
APPLICATION FILED SEPT. 25, 1914.

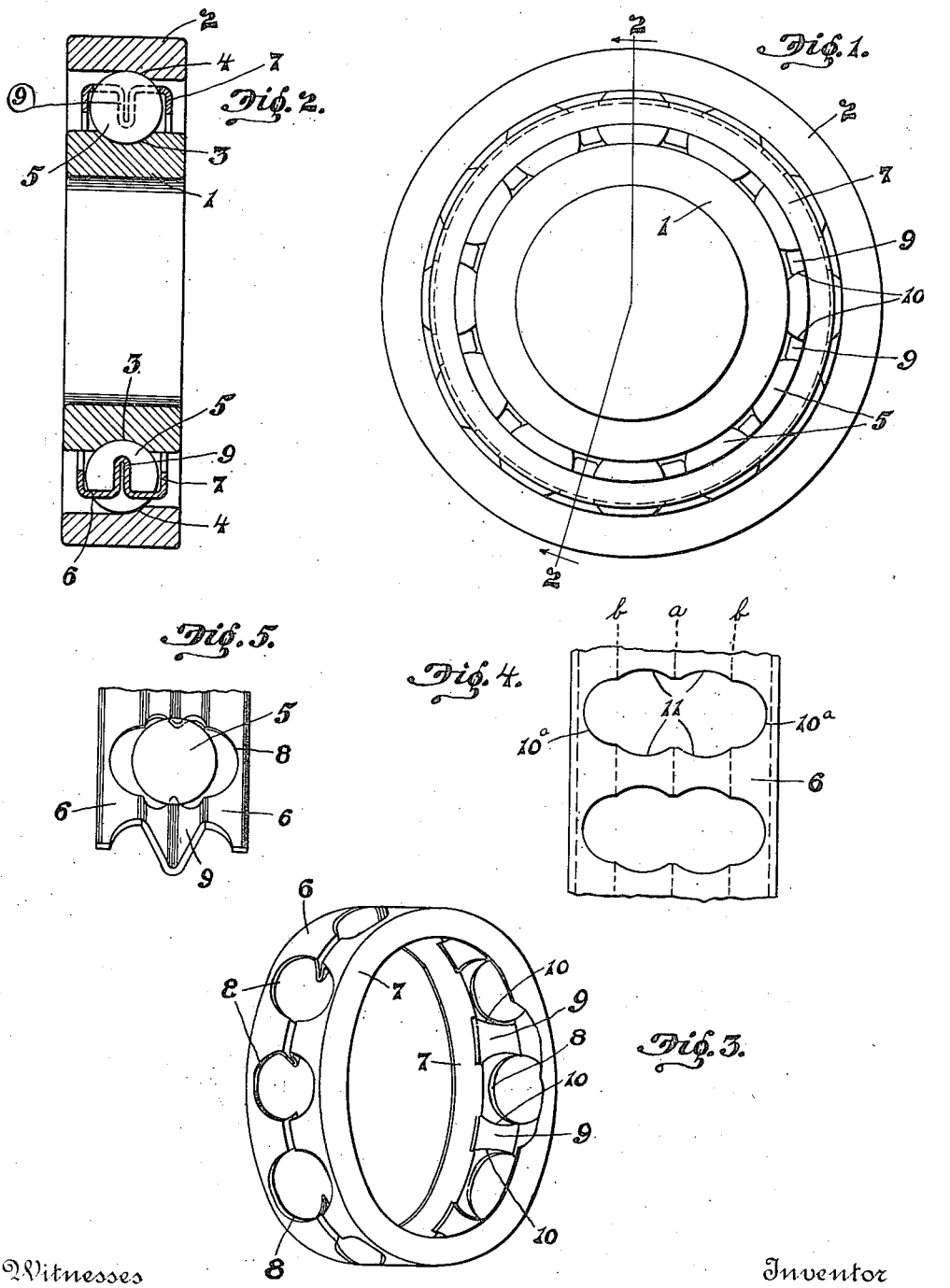

1,195,313. Patented Aug. 22, 1916.
2 SHEETS—SHEET 2.

Witnesses
J. H. Bishop.
Robert Karcher.

Inventor
Arthur K. Whitmer.
By F. W. Bond,
Attorneys

UNITED STATES PATENT OFFICE.

ARTHUR K. WHITMER, OF CANTON, OHIO, ASSIGNOR OF ONE-HALF TO WALTER W. HOENECKE, OF CANTON, OHIO.

BALL-BEARING.

1,195,313.  Specification of Letters Patent.  Patented Aug. 22, 1916.

Application filed September 25, 1914. Serial No. 863,466.

*To all whom it may concern:*

Be it known that I, ARTHUR K. WHITMER, a citizen of the United States, residing at Canton, in the county of Stark and State of Ohio, have invented a new and useful Ball-Bearing, of which the following is a specification.

My invention relates to ball bearings and more especially to the ball retainer.

The object of my invention is to produce a retainer for antifriction bearings which is simple in construction and efficient in operation and wherein friction is reduced to a minimum.

A further object is to provide a ball bearing wherein the balls are held in spaced relation from each other.

A further object is to provide a ball retainer, the construction of which holds the bearings against displacement.

With these objects in view the invention consists in the novel construction and arrangement of parts, hereinafter described, illustrated in the accompanying drawings, and particularly pointed out in the appended claim, it being understood that various changes in the form, proportion, size and minor details of construction may be made without departing from the spirit or sacrificing any of the advantages of the invention.

Figure 7:
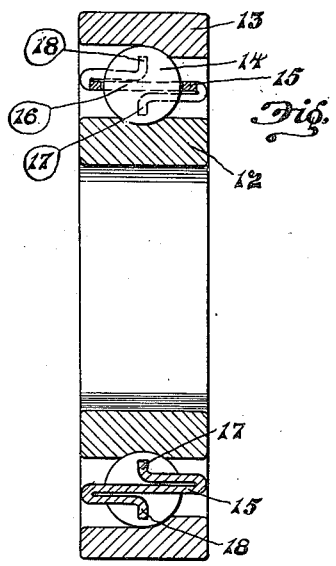
Figure 6:
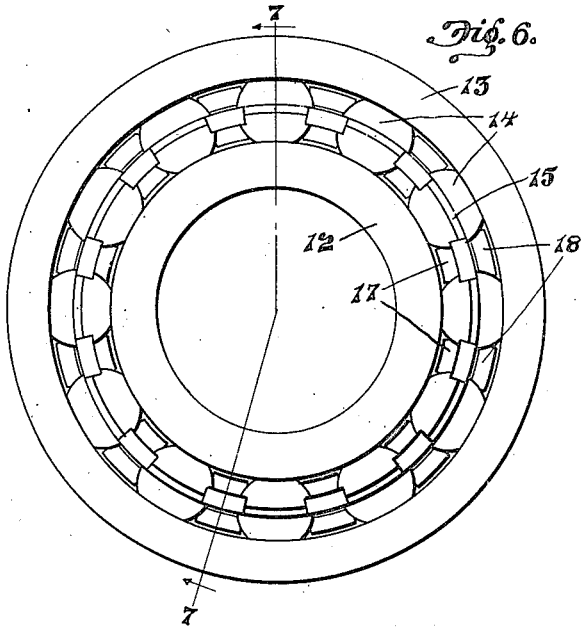
Figure 9:
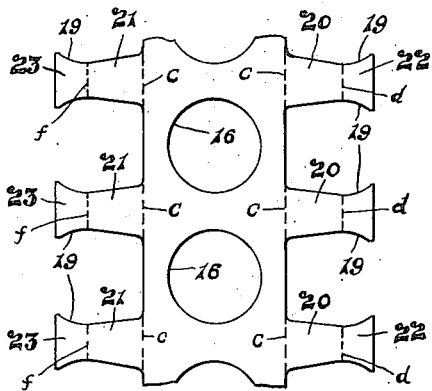
Figure 8:
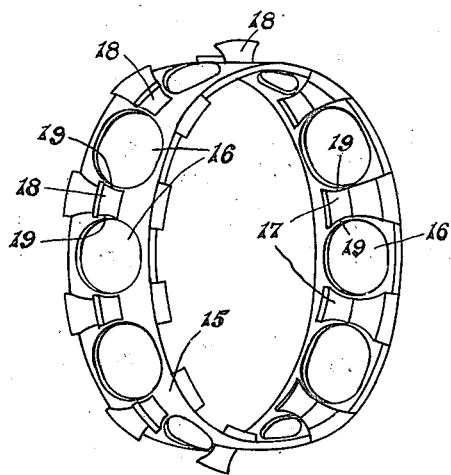

In the drawings: Figure 1 is a side view of a ball bearing made in accordance with my invention. Fig. 2 is a section on the line 2—2, Fig. 1. Fig. 3 is a perspective view of the ball retainer. Fig. 4 is a fragmentary view of a portion of the blank from which the retainer is made. Fig. 5 is a fragmentary view of a portion of the ball retainer before the balls are inserted. Fig. 6 is a side elevation of a ball bearing showing a modified form of retainer. Fig. 7 is a sectional view taken on line 7—7, of Fig. 6. Fig. 8 is a perspective view of the ball retainer. Fig. 9 is a fragmentary view of a portion of the blank from which the ball retainer is formed.

Similar numerals of reference indicate corresponding parts throughout the several figures of the drawings.

In the drawings, referring to Figs. 1 to 5 inclusive, 1 is an inner bearing ring, and 2 is an outer bearing ring, said rings being provided with ball races 3 and 4 respectively to accommodate a plurality of suitable balls 5. The ball retainer 6 is formed of sheet metal of cylindrical shape and of such diameter that it will be accommodated between the bearing rings 1 and 2, and is provided at its ends with the inwardly disposed annular flanges 7. The ball retainer is provided with a series of circular apertures 8 of a diameter slightly less than that of the balls and between each two of the apertures is located an inwardly disposed partition 9, the edges of which are curved as at 10 to conform with the contour of the balls. By this construction the balls 5 are thus held in spaced relation within the ball retainer and the retainer may be removed from between the bearing rings without causing the displacement of any of the balls but at the same time the balls are so mounted that they may be easily rotated in any direction.

The ball retainer is preferably composed of a single sheet of metal and is of the form shown in Fig. 4 before the balls are inserted. Each of the apertures in the retainer comprises two semi-circular portions 10 which are connected by two equal arches 11. The metal is bent upon the dotted lines designated by the letters *a* and *b*, the portions between the lines *b* being bent inwardly until the container assumes the form shown in Fig. 5. The balls are then inserted from the outside of the container and will contact with the curved edges 11 which act as a stop to prevent the balls from dropping entirely through the apertures. The portions of the metal which form the partitions 9 are then squeezed together thus bringing the lines *b* together thus forming the partitions 9 and the circular apertures 8 and retaining the balls within the apertures and between the partitions.

In the modified form of my invention which is shown in Figs. 6 to 9 inclusive of the drawings I employ a slightly different form of container. In this form the inner and outer bearing rings 12 and 13, similar to the bearing rings 1 and 2, are employed and a series of balls 14 are adapted to be carried between said bearing rings. The container in this form consists of a metallic ring 15 provided with apertures 16 of a diameter slightly greater than the diameter of the balls 14 and a series of inwardly and outwardly disposed partition plates 17 and 18 respectively is provided between the apertures 16. Each of the partition plates 17 and 18 is provided with curved side faces 19 adapted to conform to the contour of the balls 14.

The ball container is preferably made from a ring such as shown in Fig. 9 which is provided with a series of tapered extensions 20 and 21, the extremities of which are flared outwardly as shown at 22 and 23 and provided with the curved edges 19. After a ball is placed in position within an aperture 16, the extension 20 is bent inwardly against the inner face of the ring, upon the dotted line $c$ and the extremity thereof is bent at right angles thereto upon the dotted line $d$ thus forming the inwardly disposed partition plate 17. The adjoining extension 21 is then bent back upon the outer face of the ring, along the dotted line $e$, and the extremity 23 thereof is bent outwardly at right angles thereto upon the dotted line $f$ thus forming the outwardly disposed partition plate 18. By this construction the balls are held in position within the apertures 16 and between the partition plates 17 and 18 thus making it possible for the container to be removed from between the bearing rings, carrying the balls therewith, the balls at the same time being rotatably mounted within the retainer.

Although the drawings and above specification disclose the best mode in which I have contemplated embodying my invention I desire to be not limited to the details of such disclosure, for, in the further practical application of my invention, many changes in form and construction may be made, as circumstances require or experience suggests, without departing from the spirit of the invention, within the scope of the appended claim.

I claim:

A ball bearing cage comprising an annular sheet metal member provided with a plurality of laterally disposed elongated apertures, each aperture being formed half-round at each extremity, each side edge of each aperture intermediate the half-round portions thereof comprising two equal arcs, the dividing strip thus left between each adjacent pair of apertures being bent inwardly adjacent each edge of the annular member upon a peripheral line passing through the centers of said half-round portions of the apertures, said strip being folded upon itself through the center thereof, thus bringing the two half-round portions of each aperture together forming a circular aperture adapted to accommodate a ball, said aperture being of less diameter than the ball adapted to be retained therein, each of said dividing strips forming a partition plate provided with curved edges adapted to conform to the contour of the ball, and an inwardly disposed, annular flange provided around each edge of said annular member.

In testimony that I claim the above, I have hereunto subscribed my name in the presence of two witnesses.

ARTHUR K. WHITMER.

Witnesses:
J. H. BISHOP,
SYLVIA BORON.